UNITED STATES PATENT OFFICE.

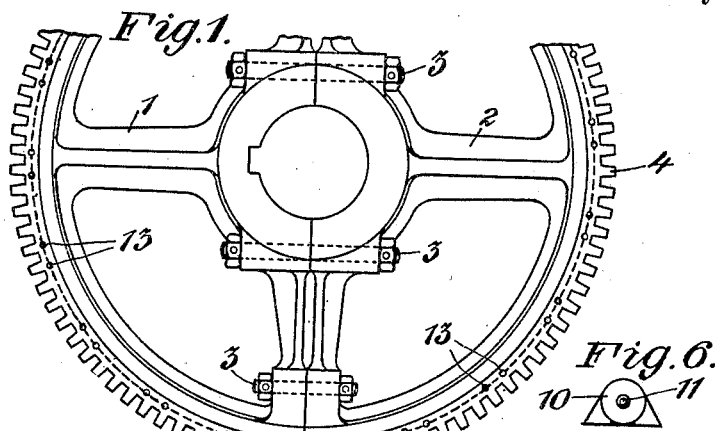

ALBERT ROTH, OF CHERNEZ-SUR-MONTREUX, AND AUGUSTE ROMANG, OF FONTANIVENT-SUR-CLARENS, SWITZERLAND.

RESILIENT GEAR-WHEEL.

1,385,796. Specification of Letters Patent. Patented July 26, 1921.

Application filed November 26, 1920. Serial No. 426,405.

*To all whom it may concern:*

Be it known that we, ALBERT ROTH, of the Swiss Railways, and AUGUSTE ROMANG, citizens of Switzerland, residing at Chernez-sur-Montreux and Fontanivent-sur-Clarens, Canton of Vaud, in the Confederation of Switzerland, have invented certain new and useful Improvements in Resilient Gear-Wheels, of which the following is a specification.

In power transmissions, for instance from an electric motor to a working machine and in vehicles, etc., it has hitherto been customary to use the so called cog or double helical spur gear which requires a relatively small space and can easily be made to suit the prevailing conditions of the particular case. It may be admitted that this gear can be built to be very robust but it involves the great drawback of the perfect rigidity of the whole system. The motor drives the shaft without any resilient intermediary member whatever. All the occasional jerks, for instance when the motor is started or braked, are transmitted one might say similarly to strokes of a hammer upon the driven shaft. A shaft which according to the calculation is amply dimensioned with regard to its static strains suffers considerably from the interference of these non-resilient strokes and it happens often that the shaft does not resist the great dynamic influence exercised. Besides this draw-back the rigid system of power transmission is affected with a number of additional inconveniences which also unfavorably influence the safety of service and are apt to considerably increase the working expenses. Such inconveniences are: frequent breakage of teeth, and if composed wheels are used, of fixing bolts, and furthermore the quick wear of the teeth. It is evident that the motors themselves too suffer from these conditions.

It has been proposed with a view to avoid these disadvantages to replace the rigid tooth wheels by some elastic intermediary member. Different designs of such resilient tooth wheels have been presented. But to all of them certain imperfections are inherent, which chiefly resides in the fact that said wheels require a great number of bolts, screws and other fastening means which are apt to easily break or to become loose, whereby the reliability and the safety of such machine members are considerably reduced. A careful attendance is required, much more so, since with the designs of this kind, hitherto known the spring parts are greatly exposed to dust, etc., and to humidity.

By this invention it is aimed to escape these inconveniences and its object is a springed tooth wheel, the rim of which is movable in the direction of the periphery with regard to the wheel body. The springs are on the adjacent sides of rim and wheel body lodged into the periphery of the tooth wheel. When the tooth wheel is started under a certain load the springs become stressed owing to convenient catches, and that part of the wheel which is not driven directly is thereupon taken along by said catches.

Since the springs are incased in the periphery of the tooth wheel no special fastening means such as bolts or the like are required for them and the springs are fully protected against the outside.

The attached drawing shows by way of example a working form of the springed tooth wheel according to invention.

Figure 1 is a side view of the wheel,

Fig. 2 a section on an enlarged scale through the center plane of same,

Fig. 3 is a section according to Fig. 2 of the wheel when rotating under load;

Figs. 4 and 5 are each a cross section on the lines A—B and C—D respectively of Fig. 2, and Figs. 6 and 7 are details in an elevation and plan.

In the example shown in the drawing the wheel body is composed of two halves 1 and 2 which are assembled by bolts 3 in a known manner. The wheel body carries the rim 4 which consists also of two halves. The rim is provided with dovetailed tongues 5 adapted to engage in a corresponding circular groove provided on the periphery of the wheel body. Each half of the rim is mounted individually upon one of the halves of the wheel body before the halves of the body are bolted together. Owing to the connection of the rim to the body by means of a tongue and groove the body and the rim permit of a displacement one with regard to the other in the direction of the periphery. Of course the body might be provided with a tongue and the rim with a groove or the rim might be mounted in any other convenient way upon the body if only the possibility of said peripheral displacement is maintained. The rim 4 is provided with a circular notch 6 into which engages a tongue 7 of dovetailed cross section of the wheel body. In this way a double connection between rim and wheel body is realized.

The tongue 7 fills however only a certain part of the cross section of the notch 6. Intervening spaces 8 are provided for in regular distance one from the other in the extreme periphery of the wheel body 1, 2 which are limited by the inner periphery of the rim 4 (Figs. 2, 3). Each of these intervening spaces 8 contains a spiral spring 9, and two spring sockets or spare-pieces 10 provided with bolts 11 which receive the spring 9. The spare pieces 10 (Figs. 6, 7) are movably inserted in the circular notch 6. The notch contains also intermediate pieces or blocks 12 which are fastened by means of cross pins 13 in such a way to the rim 4 that when the tooth wheel rotates under load, they work as catches. On each end of the cross pin 13 is a spiral spring 14 carried in a thread 15. The diameter of the unstressed spring is somewhat larger than that of the thread thus securing the cross pins in the rim against lateral movement.

If the tooth wheel such as above described and supported to run under load is rotated by a pinion gearing with it, for instance in the direction of the arrow (Fig. 3), its rim 4 will be more or less displaced upon the wheel body in accordance with the value of the circumferential power to which it is subjected. Thereby the springs 9 are depressed or stressed by means of the intermediate pieces or catches 12 and the corresponding spare-pieces 10, and the wheel body is taken along. In the case of an overload the bolts 11 of the spare-pieces 10 come to bear one against the other (Fig. 3) and the wheel body is taken along also in this case. If the driving power decreases the springs 9 become less and less stressed. In the case of a sudden braking of the driving pinion the displacement of the rim takes place in the opposite direction and the springs 9 become again stressed. The springs, catches and spare-pieces work in the same manner regardless of the direction of rotation of the tooth wheel and regardless whether the rim or the wheel body receives the primary motion. Of course, instead of being lodged in the rim, the catches could, provided that the other members of the spring arrangement are disposed accordingly, be fixed to the wheel body.

In the tooth wheel according to the invention and as described above, the parts constituting the spring arrangement are fully incased in the periphery of the tooth wheel and in the most simple manner are thereby rendered safe against dirt and humidity and also against blows of any kind. If ever a spring should break there is no danger that parts of it might get between the gears, as they are retained in the intervening spaces provided for receiving the spring. Even if all the springs were broken the tooth wheel would still continue to work as an ordinary non-springed tooth wheel. From this it ensues that with the elimination of all special fastening means for the springs such as bolts or the like and with very little attendance a high degree of safety of the service is arrived at. The rim may very easily be replaced and could be made from old wheel rims. Old and worn out tooth wheels might be made up as wheel bodies.

Having now described the nature of our invention and explained the manner in which it is put into practice we claim:

1. In a resilient gear wheel, a rim revolubly movable on the felly of the wheel and provided with undercut projections adapted to engage with similarly shaped grooves in the face of the felly of the wheel, a plurality of spring sockets employed in pairs, each spring socket fitting into a recess provided therefor in the felly of the wheel and extending into the space between the ribs on the rim, a spring extending between each pair of said spring sockets, a bolt extending from each spring socket and lying within the spring associated therewith, and a stop between each pair of spring sockets lying within the recess between the ribs on the rim and secured in position therein.

2. In a resilient gear wheel, a rim revolubly movable on the felly of the wheel and provided with undercut projections adapted to engage with similarly shaped grooves in the face of the felly of the wheel, a plurality of spring sockets employed in pairs, each spring socket fitting into a recess provided therefor in the felly of the wheel and extending into the space between the ribs on the rim, a spring extending between each pair of said spring sockets, a bolt extending from each spring socket and lying within the spring associated therewith, a stop between each pair of spring sockets lying within the recess between the ribs on the rim and secured in position therein, and transverse bolts between each stop and the said rim for securing the stop to the rim and in position in its recess.

In testimony whereof we affix our signatures in presence of two witnesses.

ALBERT ROTH.
AUGUSTE ROMANG.

Witnesses:
J. SELMAN,
JACOB RUSSELL.